US011649784B2

(12) United States Patent
Kitagawa et al.

(10) Patent No.: US 11,649,784 B2
(45) Date of Patent: *May 16, 2023

(54) CYLINDER HEAD AND ENGINE

(71) Applicant: YANMAR POWER TECHNOLOGY CO., LTD., Osaka (JP)

(72) Inventors: Tomoaki Kitagawa, Osaka (JP); Masahiro Akei, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/740,937

(22) Filed: May 10, 2022

(65) Prior Publication Data

US 2022/0268235 A1     Aug. 25, 2022

Related U.S. Application Data

(63) Continuation of application No. 17/346,416, filed on Jun. 14, 2021, now Pat. No. 11,333,100, which is a
(Continued)

(30) Foreign Application Priority Data

Dec. 15, 2017     (JP) .............................. JP2017-240549

(51) Int. Cl.
  *F02F 1/42*     (2006.01)
  *F02M 26/41*     (2016.01)
  (Continued)

(52) U.S. Cl.
  CPC *F02F 1/42* (2013.01); *F01P 3/02* (2013.01); *F01P 5/10* (2013.01); *F01P 7/161* (2013.01);
  (Continued)

(58) Field of Classification Search
  CPC .... F01N 13/10; F02D 41/006; F02D 41/0047; F02M 26/14; F02M 26/20; F02M 35/10
  See application file for complete search history.

(56) References Cited

U.S. PATENT DOCUMENTS

| 5,762,051 A | * | 6/1998 | Okamoto | ............... F02M 26/42 |
| | | | | 123/184.31 |
| 11,067,031 B2 | | 7/2021 | Kitagawa et al. | |

(Continued)

FOREIGN PATENT DOCUMENTS

| DE | 10062169 A1 | 6/2002 |
| FR | 3000778 A1 | 7/2014 |

(Continued)

OTHER PUBLICATIONS

International Search Report for PCT Patent App. No. PCT/JP2018/042770 (dated Feb. 12, 2019).

*Primary Examiner* — Long T Tran
(74) *Attorney, Agent, or Firm* — Cermak Nakajima & McGowan LLP; Tomoko Nakajima

(57) ABSTRACT

A cylinder head includes: an exhaust port configured to lead out exhaust gas from combustion chamber; an intake port configured to introduce fresh air into the combustion chamber; and an EGR gas passage in which EGR gas flows, wherein exhaust outlets of the exhaust port and an EGR gas inlet of the second EGR pipe are located on a first side of the cylinder head and, and a fresh air inlet communicated to the intake port and an EGR gas outlet of the EGR gas passage are located on a second side which is opposite from the first side.

3 Claims, 9 Drawing Sheets

Related U.S. Application Data continuation of application No. 16/762,559, filed as application No. PCT/JP2018/042770 on Nov. 20, 2018, now Pat. No. 11,067,031.

(51) Int. Cl.
*F01P 3/02* (2006.01)
*F01P 5/10* (2006.01)
*F01P 7/16* (2006.01)
*F01P 7/14* (2006.01)

(52) U.S. Cl.
CPC ... *F01P 2003/024* (2013.01); *F01P 2007/146* (2013.01); *F02M 26/41* (2016.02)

(56) References Cited

U.S. PATENT DOCUMENTS

| | | |
|---|---|---|
| 2002/0005190 A1 | 1/2002 | Bianchi |
| 2002/0062795 A1 | 5/2002 | Inoue et al. |
| 2002/0179044 A1 | 12/2002 | Iizuka et al. |
| 2004/0079348 A1* | 4/2004 | Mori ............... F02M 26/50 123/568.17 |
| 2005/0172940 A1 | 8/2005 | Iizuka et al. |
| 2010/0154759 A1* | 6/2010 | Taira ............... F02M 13/00 123/568.17 |
| 2011/0315129 A1 | 12/2011 | Kojima et al. |
| 2016/0090895 A1 | 3/2016 | Sakurai et al. |
| 2016/0102595 A1 | 4/2016 | Nagai et al. |
| 2016/0186704 A1* | 6/2016 | Murotani ............... F02M 26/28 123/568.12 |
| 2017/0260933 A1 | 9/2017 | Watanabe |
| 2018/0283324 A1 | 10/2018 | Shirley |
| 2019/0078540 A1* | 3/2019 | Uchibori ............... F02M 26/21 |
| 2019/0383245 A1* | 12/2019 | Onodera ............... F02M 26/41 |
| 2020/0340423 A1 | 10/2020 | Kitagawa et al. |
| 2021/0301758 A1 | 9/2021 | Kitagawa et al. |

FOREIGN PATENT DOCUMENTS

| | | |
|---|---|---|
| FR | 3046633 A1 | 7/2017 |
| JP | 56-65153 A | 6/1981 |
| JP | 2002-004955 A | 1/2002 |
| JP | 2002-106420 A | 4/2002 |
| JP | 2003-201842 A | 7/2003 |
| JP | 3850940 B | 9/2006 |
| JP | 2010-150927 A | 7/2010 |
| JP | 2015-034530 A | 2/2015 |
| JP | 2016-070114 A | 5/2016 |
| JP | 2016-079814 A | 5/2016 |
| JP | 2017-180227 A | 10/2017 |
| WO | WO2013/121121 A1 | 8/2013 |

* cited by examiner

CYLINDER HEAD AND ENGINE

This application is a Continuation of, and claims priority under 35 U.S.C. § 120 to, U.S. patent application Ser. No. 17/346,416, filed on Jun. 14, 2021, which was a Continuation of U.S. patent application Ser. No. 16/762,559, filed on May 8, 2020, which was issued on Jul. 20, 2021 as U.S. Pat. No. 11,067,031, which in turn was a Continuation under 35 U.S.C. § 120 of PCT Patent Application No. PCT/JP2018/042770, filed on Nov. 20, 2018, which claimed priority under 35 U.S.C. § 119 to Japanese Patent Application No. 2017-240549, filed Dec. 15, 2017, all of which are incorporated by reference.

TECHNICAL FIELD

The present invention relates to a cylinder head and an engine having the cylinder head.

BACKGROUND ART

The following Patent Literature 1 (hereinafter, PTL 1) discloses an engine having an EGR passage arranged inside the cylinder head thereof. Further, the following Patent Literature 2 (hereinafter, PTL 2) discloses an engine in which an intake manifold is integrally formed with a cylinder head. The following Patent Literature 3 (hereinafter, PTL 3) discloses an engine having a thermostat arranged inside the cylinder head thereof.

CITATION LIST

Patent Literature

PTL 1: Japanese Patent Application Laid-Open No. 2015-34530
PTL 2: Japanese Patent Application Laid-Open No. 2017-180227
PTL 3: Japanese Patent No. 3850940

SUMMARY OF INVENTION

Technical Problem

In PTL 1 to PTL 3, the cylinder head is integrally formed with an engine component such as the EGR passage, the intake manifold, and the thermostat. However, such a structure forms a steplike shape on the surface of the cylinder head, which makes 6-face machining difficult. This requires a number of machining processes and high costs.

In view of the above problem, it is an object of the present invention to provide a cylinder head whose shape facilitates 6-face machining, and an engine having such a cylinder head.

Solution to Problem

An aspect of the present invention is a cylinder head including: a plurality of exhaust ports configured to lead out exhaust gas from combustion chambers;
a plurality of intake ports configured to introduce fresh air into the combustion chambers;
an intake air aggregate part configured to aggregate the plurality of intake ports; and
an EGR gas passage in which EGR gas flows, wherein exhaust outlets of the plurality of exhaust ports and an EGR gas inlet of the EGR gas passage are arranged side-by-side on a flat first side surface, and
a fresh air inlet of the intake air aggregate part and an EGR gas outlet of the EGR gas passage are arranged side-by-side on a flat second side surface which is a side opposite to the first side surface.

The cylinder head of the present invention makes 6-face machining easy, because the exhaust outlet or exhaust ports and EGR gas inlet of the EGR gas passage are arranged side-by-side on the flat first side surface, and the fresh air inlet of the intake air aggregate part and the EGR gas outlet of the EGR gas passage are arranged side-by-side on the flat second side surface.

The cylinder head of the above aspect of the present invention may further include: a thermostat case whose top part is open and communicates with a cooling water outlet pipe;
a water jacket configured to cool the combustion chambers with cooling water;
a cooling water passage communicating with the thermostat case and the water jacket, wherein
the water jacket is formed so that the cooling water flows from an exhaust side to an intake side,
the cooling water passage is formed so that the cooling water flows from the exhaust side towards the thermostat case,
a height of the water jacket on the exhaust side is higher than a height of the water jacket on the intake side, and
a height of the cooling water passage on a side of the thermostat case is equal to or higher than a height of the cooling water passage on the exhaust side.

This water jacket is formed in such a manner that its height on the exhaust side is higher than its height on the intake side. Therefore, air may be accumulated on the exhaust side. However, by forming the cooling water passage in such a manner that its height on the side of the thermostat case is equal to or higher than the height of the cooling water passage on the exhaust side, the accumulated air on the exhaust side of water jacket can be fed out to the side of the thermostat case through the cooling water passage. Therefore, the cooling efficiency of the engine can be improved.

The cylinder head of the above aspect of the present invention may be such that the thermostat case has a cooling water outlet that opens in a worked surface of a top surface machined to be flat.

This structure makes 6-face machining easy, because the cooling water outlet of the thermostat case is arranged on the worked surface of the top surface machined to be flat.

An engine according to an aspect of the present invention includes the above described cylinder head, and a cooling water pump is arranged immediately below the thermostat case.

With this structure, a compact engine can be designed.

EMBODIMENT OF EMBODIMENT

In the following, an embodiment of the present invention will be described with reference to the drawings.

Figure 1:
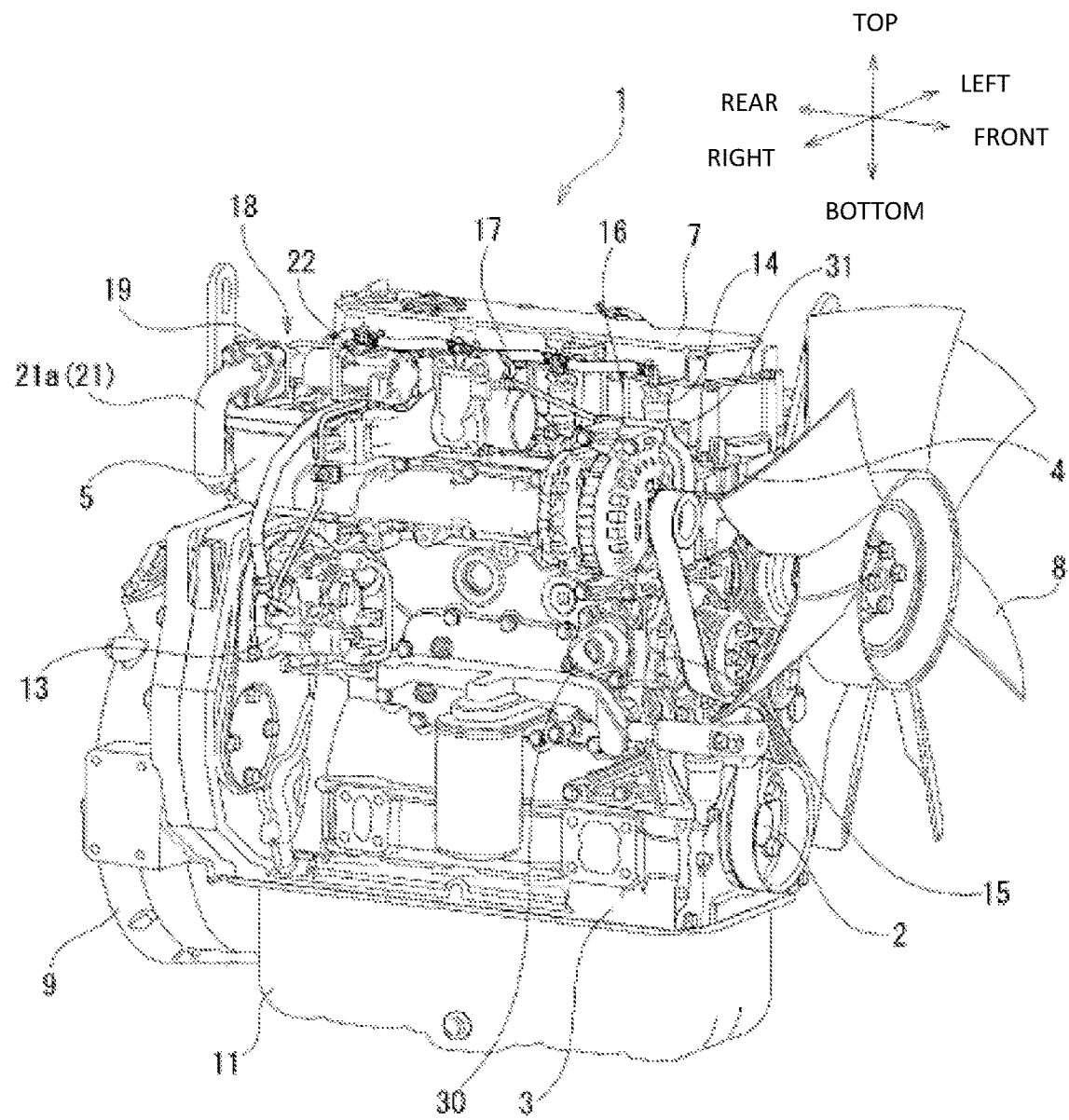
FIG. 1 A perspective view of an engine according to an embodiment.

First, a schematic structure of the engine 1 is described with reference to FIG. 1 and FIG. 2. It should be noted that, in the following description, two sides parallel to a crankshaft 2 are referred to as the left and right. A side where a cooling fan 8 is arranged is referred to as the front side. A side where a flywheel housing 9 is arranged is referred to as the rear side. A side where an exhaust manifold 6 is arranged is referred to as the left side. A side where an intake manifold 5 is arranged is referred to as the right side. A side where a cylinder head cover 7 is arranged is referred to as the upper side. A side where an oil pan 11 is arranged is referred to as the lower side. These expressions are used as the references of four directions and the positional relation of the engine 1.

An engine 1 as a motor mounted to a work machine such as an agricultural machine and a construction machine includes a crankshaft 2 serving as an output shaft of the engine and a cylinder block 3 having therein a piston (not shown). On the cylinder block 3, a cylinder head 4 is mounted. On the right side surface of the cylinder head 4, an intake manifold 5 is arranged. On the left side surface of the cylinder head 4, an exhaust manifold 6 is arranged. The top surface side of the cylinder head 4 is covered by a head cover 7. The crankshaft 2 has its front and rear ends protruding from front and rear surfaces of the cylinder block 3. On the front surface side of the engine 1, a cooling fan 8 is arranged. From the front end side of the crankshaft 2, rotational power is transmitted to the cooling fan 8 through a cooling fan V-belt.

On the rear surface side of the engine 1, a flywheel housing 9 is arranged. The flywheel housing 9 accommodates therein a flywheel 10 pivotally supported at the rear end side of the crankshaft 2. The rotational power of the engine 1 is transmitted from the crankshaft 2 to operating units of the work machine through the flywheel 10. An oil pan 11 for storing an engine oil is arranged on a lower surface of the cylinder block 3. The engine oil in the oil pan 11 is supplied to lubrication parts of the engine 1 through an oil pump in the cylinder block 3, and then returns to the oil pan 11.

A fuel supply pump 13 is arranged below the intake manifold 5 on the right side surface of the cylinder block 3. Further, the engine 1 includes injectors 14 for four cylinders. Each of the injectors 14 has a fuel injection valve of electromagnetic-controlled type. By controlling the opening/closing of the fuel injection valves of the injectors 14, the high-pressure fuel in a common rail is injected from the injectors 14 to the respective cylinders of the engine 1.

On the front surface side of the cylinder block 3, a cooling water pump 15 for supplying cooling water is arranged. The rotational power of the crankshaft 2 drives the cooling water pump 15 along with the cooling fan 8, through the cooling fan V-belt. With the driving of the cooling water pump 15, the cooling water in a radiator (not shown) mounted to the work machine is supplied to the cylinder block 3 and the cylinder head 4 and cools the engine 1. Then the cooling water having contributed to the cooling of the engine 1 returns to the radiator. Above the cooling water pump 15, an alternator 16 is arranged.

The cooling water pump 15 is disposed below the intake manifold 5, and a cooling water inlet pipe 30 in communication with the cooling water outlet of the radiator is arranged on the right side surface of the cylinder block 3, at a height equal to the height of the cooling water pump 15. A cooling water outlet pipe 31 that is in communication with a cooling water inlet of the radiator is fixed to an upper right side surface of the cylinder head 4.

The intake manifold 5 is connected to an intake throttle member 17. The fresh air (outside air) suctioned by the air cleaner is subjected to dust removal and purification in the air cleaner, and fed to the intake manifold 5 through the intake throttle member 17, and then supplied to the respective cylinders of the engine 1.

In an upper portion of the intake manifold 5, an EGR device 18 is arranged. The EGR device 18 is a device that supplies part of the exhaust gas of the engine 1 (EGR gas from the exhaust manifold 6) to the intake manifold 5, and includes an EGR pipe 21 connecting to the exhaust manifold 6 through an EGR cooler 20 and an EGR valve case 19 that communicates the intake manifold 5 to the EGR pipe 21.

A downwardly-open end portion of the EGR valve case 19 is bolt-fastened to an inlet of the intake manifold 5 protruding upward from the intake manifold 5. Further, a rightwardly-open end portion of the EGR valve case 19 is coupled to an outlet side of the EGR pipe 21. By adjusting the opening degree of the EGR valve member (not shown) in the EGR valve case 19, the amount of EGR gas supplied from the EGR pipe 21 to the intake manifold 5 is adjusted. The EGR valve member is driven by an actuator 22 attached to the EGR valve case 19.

In the intake manifold 5, the fresh air supplied from the air cleaner to the intake manifold 5 through the intake throttle member 17 is mixed with the EGR gas (part of exhaust gas from the exhaust manifold 6) supplied from the exhaust manifold 6 to the intake manifold 5 through the EGR valve case 19. As described, by recirculating part of the exhaust gas from the exhaust manifold 6 to the engine 1 through the intake manifold 5, the combustion temperature is lowered and the emission of nitrogen oxide (NOX) from the engine 1 is reduced.

The EGR pipe 21 is connected to the EGR cooler 20 and the EGR valve case 19. The EGR pipe 21 includes a first EGR pipe 21a arranged on the right side of the cylinder head 4, a second EGR pipe 21b formed in a rear end portion of the cylinder head 4, and a third EGR pipe 21c arranged on the left side of the cylinder head 4.

The first EGR pipe 21a is generally an L-shaped pipe. The first EGR pipe 21a has its inlet side coupled to an outlet side of the second EGR pipe 21b, and has its outlet side coupled to the EGR valve case 19.

Figure 2:
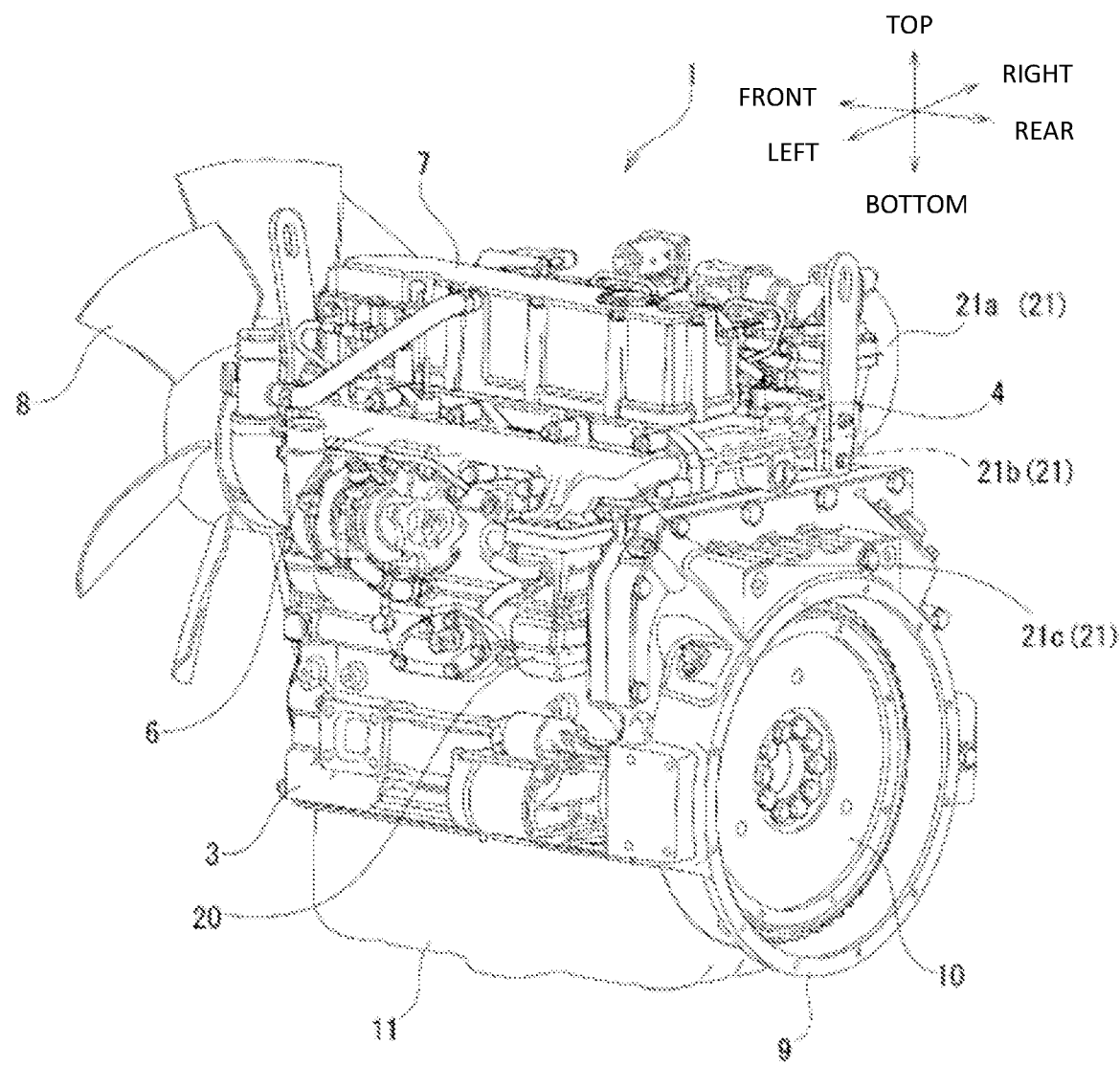
FIG. 2 A perspective view of the engine according to the embodiment.

The second EGR pipe 21b is formed in such a manner as to penetrate through the rear end portion of the cylinder head 4 in the left-and-right directions as shown in FIG. 2. In other words, the second EGR pipe 21b and the cylinder head 4 are integrally formed. The second EGR pipe 21b has its inlet side coupled to an outlet side of the third EGR pipe 21c, and has its outlet side connected to the inlet side of the first EGR pipe 21a.

The third EGR pipe 21c is formed inside the exhaust manifold 6. In other words, the third EGR pipe 21c and the exhaust manifold 6 are integrally formed. With the third EGR pipe 21c and second EGR pipe 21b integrally formed with the exhaust manifold 6 and the cylinder head 4, respectively, the space needed can be saved, and the pipes less likely receive an external impact.

Figure 3A:
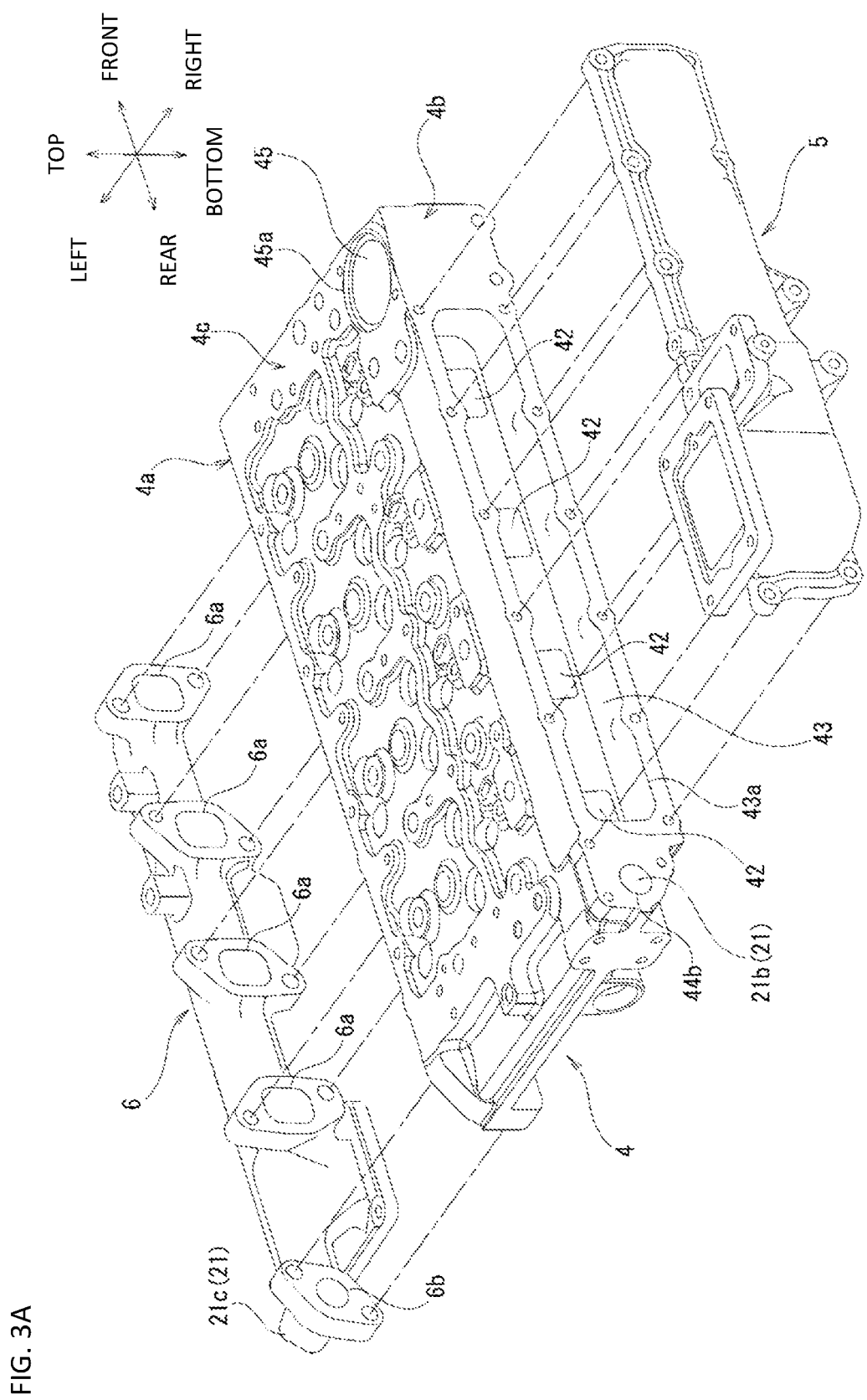
FIG. 3A An exploded perspective view of a cylinder head, an intake manifold, and an exhaust manifold.
Figure 3B:
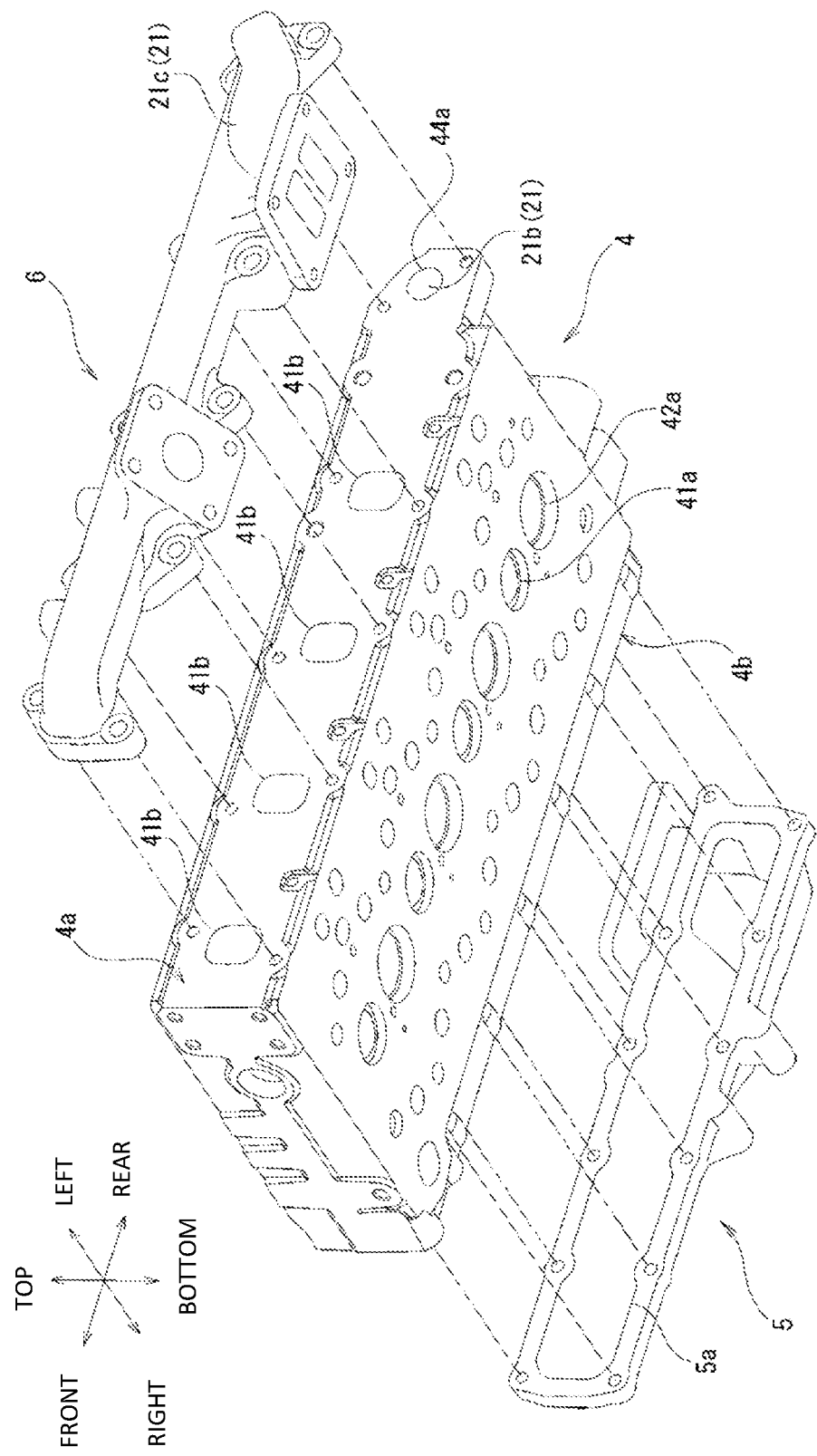
FIG. 3B An exploded perspective view of the cylinder head, the intake manifold, and the exhaust manifold.
Figure 4:
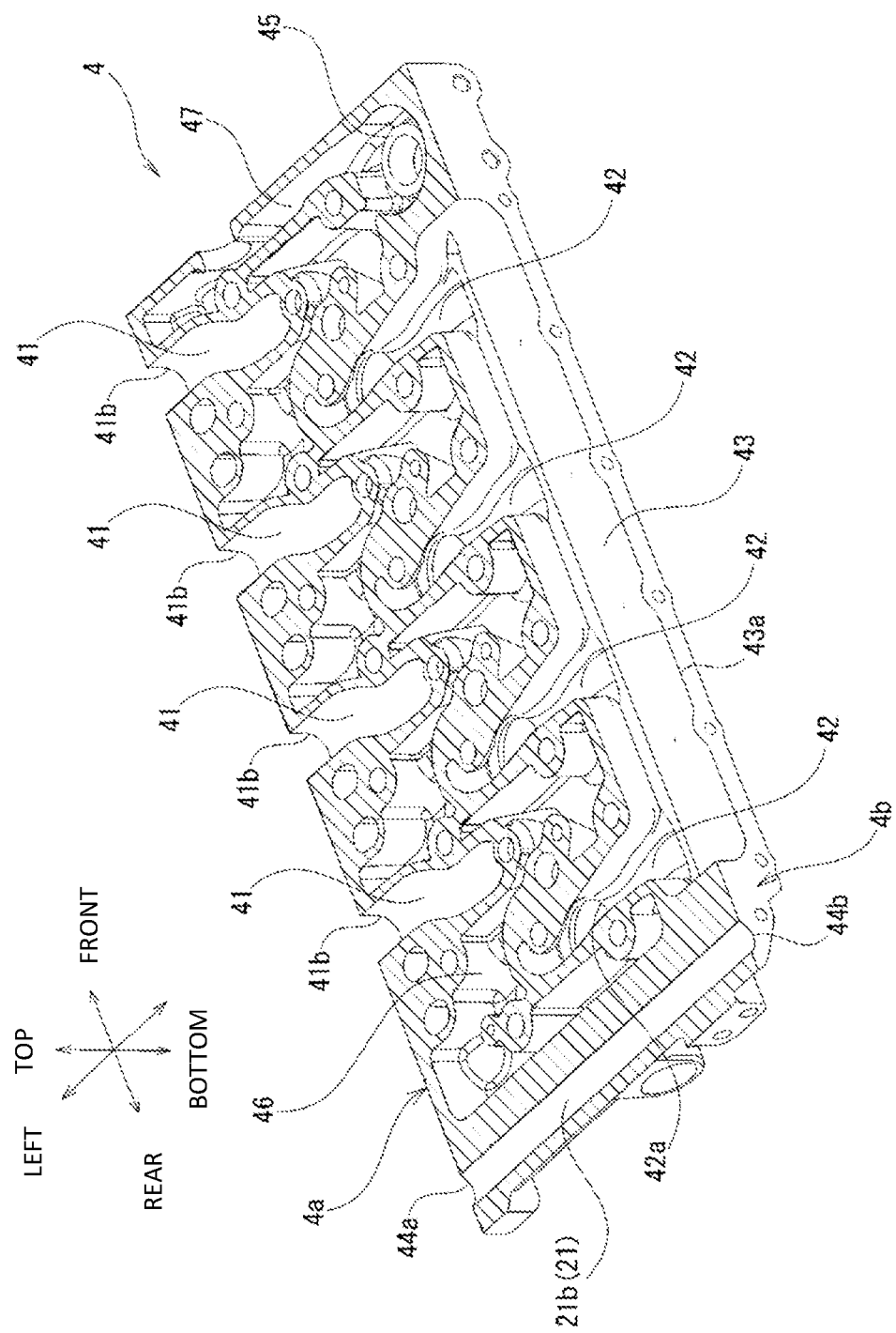
FIG. 4 A perspective cross-sectional view of the cylinder head.
Figure 5A:
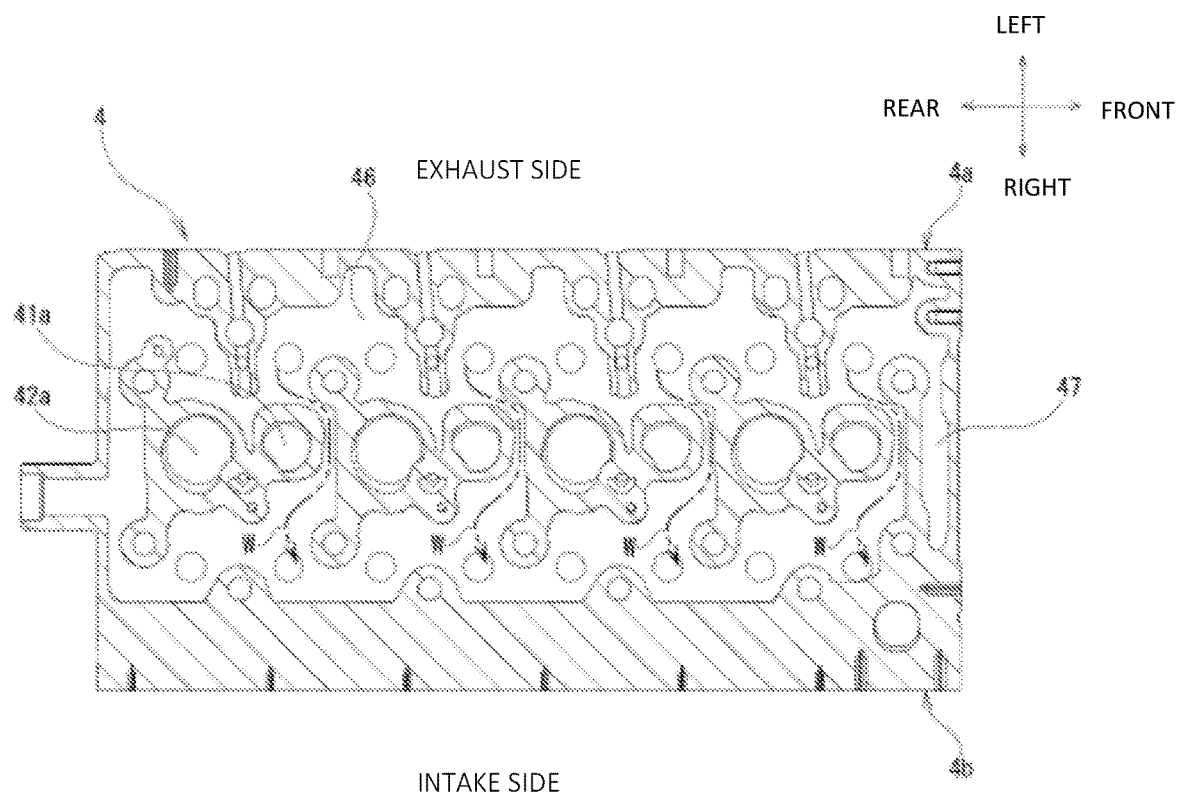
FIG. 5A A cross-sectional view of a lower portion of the cylinder head relative to an up and down direction.
Figure 5B:
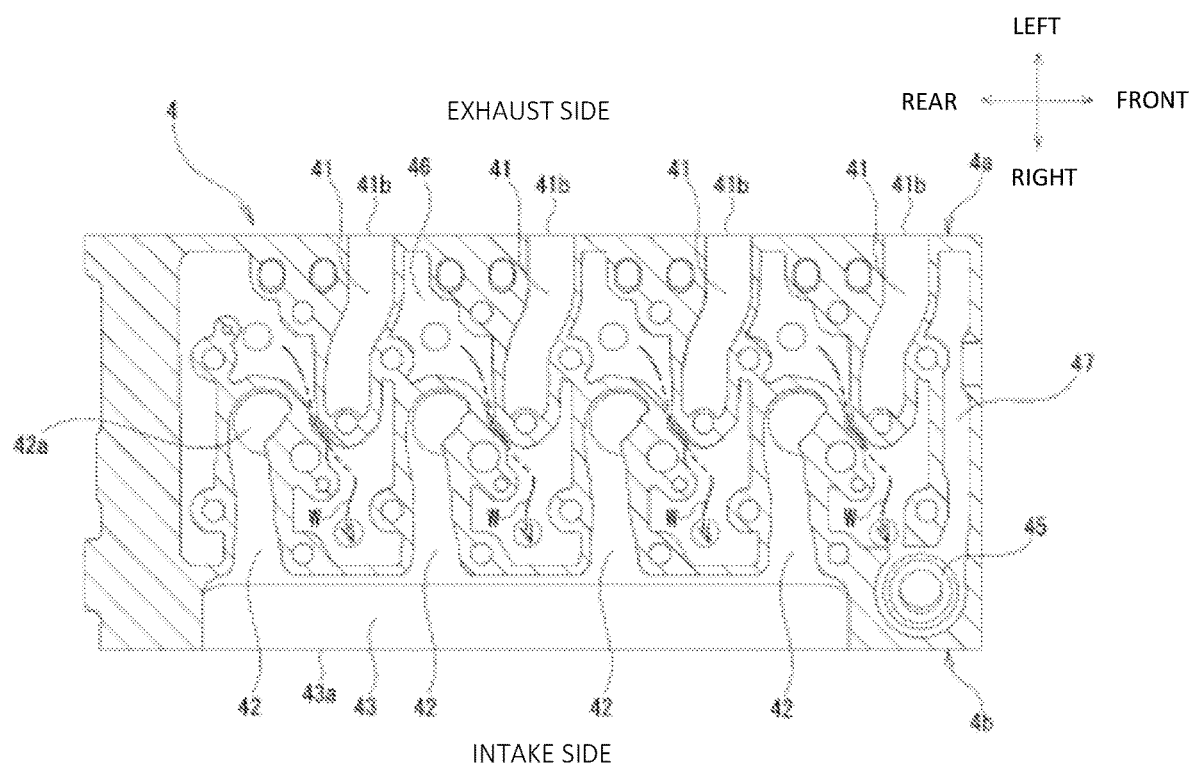
FIG. 5B A cross-sectional view of a middle portion of the cylinder head relative to an up and down direction.
Figure 5C:
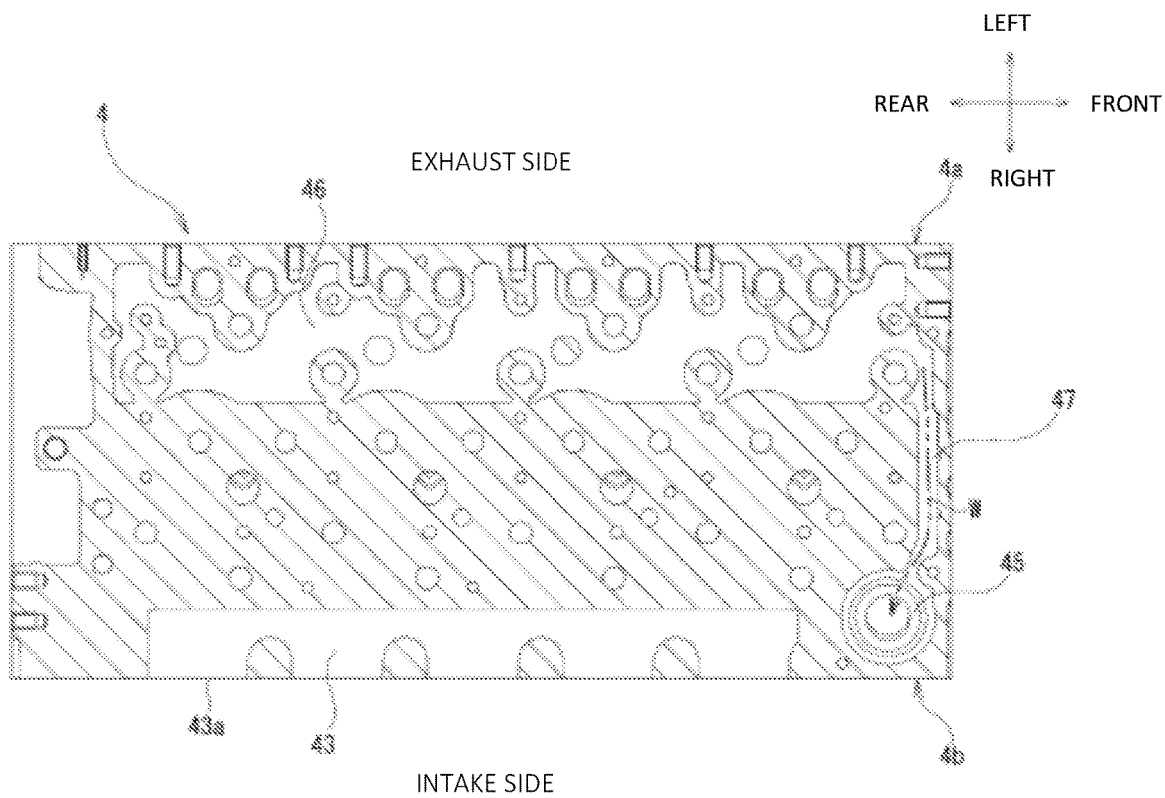
FIG. 5C A cross-sectional view of an upper portion of the cylinder head relative to an up and down direction.

Next, the following describes a structure of the cylinder head 4 with reference to FIG. 3A, FIG. 3B, FIG. 4, FIG. 5A, FIG. 5B, and FIG. 5C. FIG. 3A and FIG. 3B are each an exploded perspective view of the cylinder head 4, the intake manifold 5, and the exhaust manifold 6. FIG. 3A and FIG. 3B are views as seen in different directions. FIG. 4 is a perspective cross-sectional view of the cylinder head 4 nearby the middle relative to an up and down direction. FIG. 5A, FIG. 5B, and FIG. 5C are cross-sectional views showing a lower portion, a middle portion, and a top portion of the cylinder head 4 relative to the up and down direction, respectively.

The cylinder head 4 has a generally rectangular parallelepiped shape. After casting, six surfaces of the cylinder head 4 (four side surfaces and two surfaces that are top and bottom surfaces) are subjected to a cutting process. As shown in FIG. 4 and the like, the cylinder head 4 includes: a plurality of exhaust ports 41 configured to lead out exhaust gas from combustion chambers; a plurality of intake ports 42 configured to introduce fresh air into the combustion chambers; an intake air aggregate part 43 configured to aggregate the plurality of intake ports 42; and a second EGR pipe 21b in which EGR gas flows (corresponding to EGR gas passage of the present invention).

Each of the exhaust ports 41 is in communication with an exhaust valve hole 41a (see FIG. 3B, FIG. 5A, and the like) opened in the top surface of the corresponding cylinder, and leads out exhaust gas from the corresponding combustion chamber. In the position of the exhaust valve hole 41a, a not-shown exhaust valve is provided. Each exhaust port 41 extends towards left from the exhaust valve hole 41a, and the exhaust outlet 41b opens in the left side surface 4a (corresponding to the first side surface of the present invention) of the cylinder head 4. A plurality of the exhaust outlets 41b are arranged and aligned in a front-and-rear direction. On the other hand, the exhaust manifold 6 has a plurality of exhaust inlets 6a respectively communicating with the plurality of the exhaust outlets 41b, the exhaust inlets 6a being arranged and aligned in the front-and-rear direction on a right side surface to be coupled with the left side surface 4a of the cylinder head 4.

Each of the intake ports 42 is in communication with an intake valve hole 42a (see FIG. 3B, FIG. 5A, and the like) opened in the top surface of the corresponding cylinder, and introduces fresh air into the corresponding combustion chamber. In a position of the intake valve hole 42a, a not-shown intake valve is provided. The intake port 42 extends to the right from the intake valve hole 42a.

On the right side surface 4b of the cylinder head 4, the intake air aggregate part 43 that aggregates the plurality of intake port 42 is formed. The intake air aggregate part 43 is in communication with a fresh air inlet of the plurality of intake port 42. A fresh air inlet 43a of the intake air aggregate part 43 opens in the right side surface 4b of the cylinder head 4 (corresponding to the second side surface of the present invention). On the other hand, the intake manifold 5 has a fresh air outlet 5a that communicates with the fresh air inlet 43a, on the left side surface to be coupled with the right side surface 4b of the cylinder head 4.

The second EGR pipe 21b is formed in such a manner as to penetrate through the rear end portion of the cylinder head 4 in the left-and-right directions as described hereinabove.

The second EGR pipe 21b is provided in the rear of the exhaust port 41 and the intake port 42. The EGR gas inlet 44a of the second EGR pipe 21b opens in the rear of the left side surface 4a of the cylinder head 4. On the other hand, the exhaust manifold 6 has an EGR gas outlet 6b of a third EGR pipe 21c. The EGR gas outlet 6b communicates with the EGR gas inlet 44a, and is arranged on the right side surface of the exhaust gas manifold 6 to be coupled with the left side surface 4a of the cylinder head 4. The plurality of the exhaust outlets 41b and the EGR gas inlet 44a are arranged side-by-side in the front-and-rear direction on the left side surface 4a of the cylinder head 4 having been subjected to a cutting process to be flat. In other words, the plurality of exhaust outlets 41b and the EGR gas inlets 44a are open in the same plane.

Further, the EGR gas outlet 44b of the second EGR pipe 21b is open at the rear of the right side surface 4b of the cylinder head 4. The fresh air inlet 43a of the intake air aggregate part 43 and the EGR gas outlet 44b are arranged side-by-side on the right side surface 4b of the cylinder head 4 having been subjected to a cutting process to be flat. That is, the fresh air inlet 43a and the EGR gas outlet 44b are opened in the same plane.

In a front portion of the right side surface 4b of the cylinder head 4, there is provided a thermostat case 45 whose upper portion is open and which communicates with the cooling water outlet pipe 31. The thermostat case 45 is provided in front of the intake manifold 43. Inside the thermostat case 45, a not-shown thermostat is arranged. The cooling water outlet 45a of the thermostat case 45 is opened in the worked surface of the top surface 4c of the cylinder head 4 machined to be flat.

Inside the cylinder head 4, a water jacket 46 is provided. The water jacket 46 is formed around the exhaust ports 41 and the intake ports 42. As shown in FIG. 5A and FIG. 5B, the water jacket 46 is provided on both the exhaust side and the intake side from the lower surface side of the cylinder head 4 to the vicinity of the middle portion relative to the up and down direction. As shown in FIG. 5C, the water jacket 46 is provided only on the exhaust side, in the upper surface side of the head 4. That is, the height of the water jacket 46 on the exhaust side is higher than the height of the water jacket 46 on the intake side. The cooling water in the water jacket 46 flows in a direction from the exhaust side to the intake side as indicated by an arrow W in FIG. 5A and FIG. 5B.

In the cylinder head 4, a cooling water passage 47 communicating with the thermostat case 45 and the water jacket 46 is provided. The cooling water passage, the thermostat case 45 and the water jacket 46. The cooling water passage 47 is formed at a front part of the cylinder head 4. The height of the cooling water passage 47 on the side of the thermostat case 45 is equal to or higher than the height of the cooling water passage 47 on the exhaust side. In the present embodiment, the height of the cooling water passage 47 on the side of the thermostat case 45 and the height of the cooling water passage 47 on the exhaust side are substantially the same as shown in FIG. 5C. This way, the cooling water in the cooling water passage 47 flows from the exhaust side towards the thermostat case 45. As a result, the air accumulated on the exhaust side of the water jacket 46 can be fed to the side of the thermostat case 45, and the cooling efficiency of the engine 1 can be increased.

Figure 6:
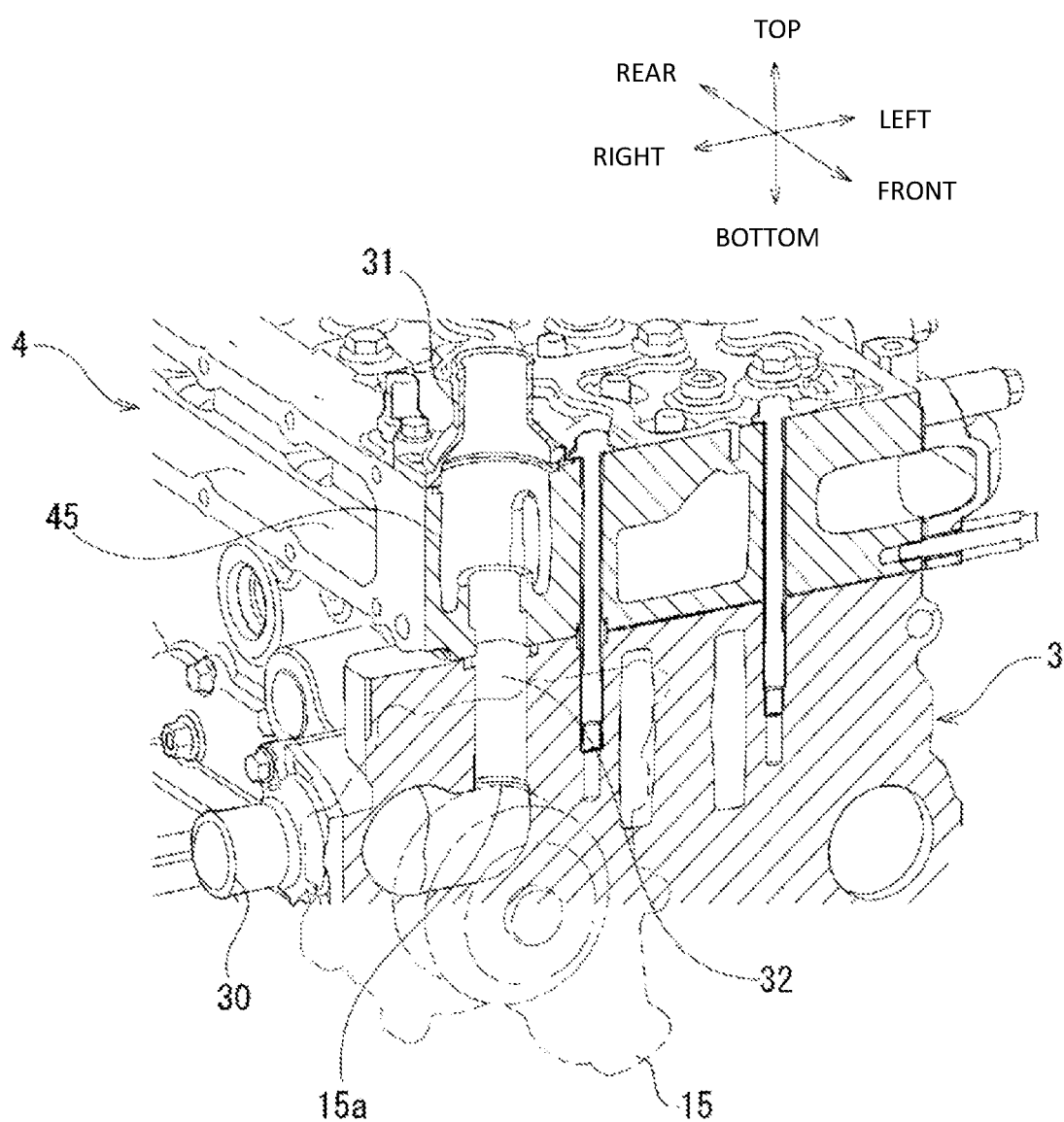
FIG. 6 A cross-sectional view of the cylinder block and the cylinder head.

FIG. 6 is a cross-sectional view of the cylinder block 3 and the cylinder head 4 cut in the up and down direction at a position of the thermostat case 45. The cooling water pump 15 is arranged immediately below the thermostat case 45.

More specifically, the thermostat case 45 and the cooling water inlet 15a of the cooling water pump 15 are arranged side by side in the up and down direction. To a lower portion of the thermostat case 45, a bottom bypass 32 in which cooling water flows when the thermostat is closed is connected. The bottom bypass 32 is formed at the front of the cylinder block 3. The bottom bypass 32 extends in the up and down direction and communicates with the cooling water inlet 15a of the cooling water pump 15. By arranging the cooling water pump 15 immediately below the thermostat case 45, the bottom bypass 32 can be formed in a simple shape. Therefore, a compact design of the engine 1 can be possible.

An embodiment of the present invention has been described with reference to the drawings. It however should be considered that specific configurations of the present invention are not limited to this embodiment. The scope of this invention is indicated by the range of patent claims as well as the description of the enforcement form described above, as well as the range of patent claims and even meaning and all changes within the range.

REFERENCE SIGNS LIST 1 engine
4 cylinder head
4a left side surface
4b right side surface
4c top surface
15 cooling water pump
21b second EGR pipe
41 exhaust port
41b exhaust outlet
42 intake port
43 intake air aggregate part
43a fresh air inlet
44a EGR gas inlet
44b EGR gas outlet
45 thermostat case
45a cooling water outlet
46 water jacket
47 cooling water passage

The invention claimed is:

1. A cylinder head of an engine, comprising:
   an exhaust port configured to lead out exhaust gas from combustion chamber;
   an intake port configured to introduce fresh air into the combustion chamber; and
   an EGR gas passage in which EGR gas flows,
   wherein exhaust outlets of the exhaust port and an EGR gas inlet of the EGR gas passage are located on a first side of the cylinder head and,
   a fresh air inlet communicated to the intake port and an EGR gas outlet of the EGR gas passage are located on a second side which is opposite from the first side.

2. The cylinder head of an engine according to claim 1, wherein the exhaust outlets of the exhaust port and the EGR gas inlet of the EGR gas passage are located on a first side surface of the cylinder head where the first side is located and,
   the fresh air inlet and the EGR gas outlet of the EGR gas passage are located on a second side surface of the cylinder head where the second side is located.

3. The cylinder head of an engine according to claim 1, further comprising:
   a cooling water passage provided inside the cylinder head,
   a cooling water outlet defined as an opening and formed at an upper side-of the cylinder head.

\* \* \* \* \*